Feb. 18, 1969      P. A. DORZAN      3,427,908

PROTECTIVE MOUNTING FOR A DIAL INDICATOR

Filed March 31, 1967

INVENTOR.
PETER A. DORZAN
BY
Popper, Bain & Bobis
ATTORNEYS

United States Patent Office 3,427,908
Patented Feb. 18, 1969

3,427,908
PROTECTIVE MOUNTING FOR A
DIAL INDICATOR
Peter A. Dorzan, 1 Muir Road,
Union, N.J. 07083
Filed Mar. 31, 1967, Ser. No. 627,381
U.S. Cl. 82—34                8 Claims
Int. Cl. B23b 25/06

ABSTRACT OF THE DISCLOSURE

A protective mounting for a dial indicator that yields to the lathe-carriage by sliding on gripping surfaces of the mounting that have seized the way on which the lathe-carriage moves, the mounting being pushed by a stop carried by the mounting that is engaged by the advancing lathe-carriage.

---

It is among the objects of this invention to provide a protective mounting for a dial indicator used in conjunction with lathes, that does not require any tools to secure it to the lathe.

It is another object of the invention to provide a mounting for a dial indicator that will hold the dial indicator safely and will not damage it.

A still further object of the invention is to provide a mounting for a dial indicator that will grip the way of the lathe firmly and yet will yield to pressure of the carriage before the dial indicator reaches its full capacity.

Yet another object of the invention is to provide a mounting for a dial indicator which is suitable for mounting numerous different dial indicators of varying sizes and capacities.

A still further object of the invention is to provide a lathe protective mounting for a dial indicator that is suitable for use not only for longitudinal feed, but also for cross feed.

In operating lathes, it is frequently the practice to mount on the lathe bed, a dial gauge having an indicator probe that meets and engages the carriage and registers, on the dial of the gauge, the distance that the carriage has travelled. This measurement is registered by reason of the carriage encountering a probe which it moves into the body of the gauge; the amount of movement of the probe is registered on a dial. When the dial indicator is rigidly mounted on the lathe bed, the movement of the carriage must be controlled, for if it is permitted to go beyond the yieldable limit of the probe, the dial gauge is broken from its rigid mounting. Such gauges are quite costly, and the present invention is intended to provied a rigid mounting which prevents damages from inflicted upon dial gauges. The rigid mounting yields to the advancing movement of the lathe carriage before the yieldable limit of the probe is reached; the mounting slides along the way as the carriage advances.

Referring now to the drawings in detail:

Figure 1:
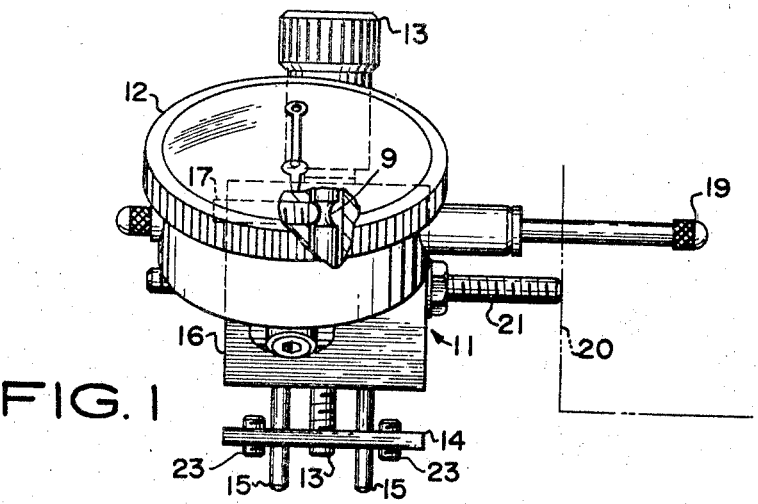
FIGURE 1 shows a front elevational view of a dial gauge attached to a mounting for attaching the gauge to the way on the bed of a lathe.
Figure 2:
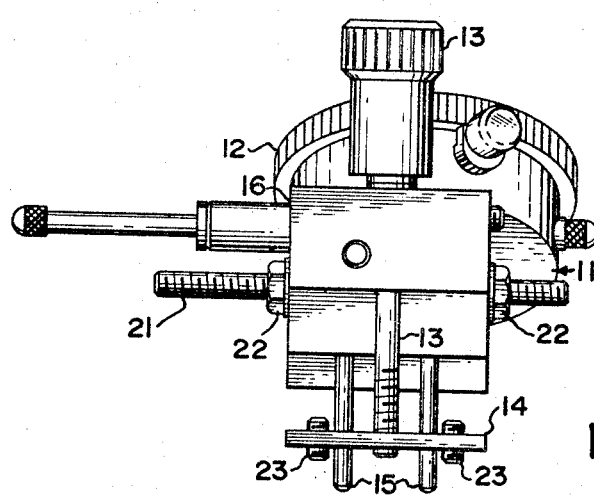
FIGURE 2 is a rear elevational view of the mounting and dial gauge.
Figure 3:
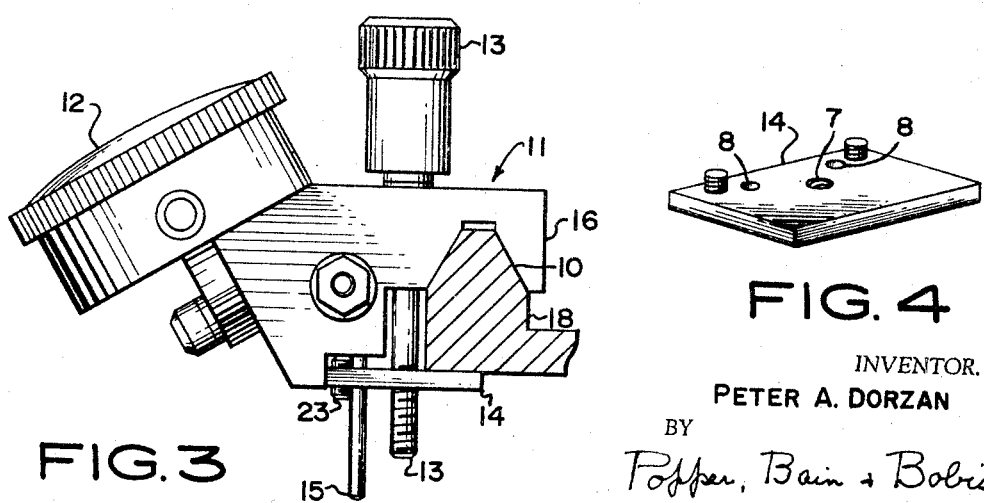
FIGURE 3 is a side elevational view of the mounting for the dial gauge, showing it attached to the way on the bed of the lathe.
Figure 4:
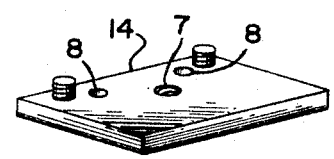
FIGURE 4 is a view in perspective of the lower plate of the mounting for the dial gauge.

Referring now to the drawings in detail, the yieldable mounting 11 for the dial gauge or dial indicator 12 provides an upper block or base 16. The dial indicator 12 is attached to this base 16. The bottom of the base 16 is provided with a transverse latitudinal channel 10, which may be provided with a truncated conical cross-sectional configuration so as to approximately fit the way 18 on the bed of the lathe, as shown in FIGURE 3. The base 16 is provided with a smooth bore through which an adjustment screw 13 passes. The adjustment screw 13 is provided with a constriction 9 that is engaged by a pin 17 (see FIGURE 1, breakaway section). Thus, the adjustment screw 13 may be rotated without changing its position relative to the upper block 16, and is held in the bore of the block.

Extending from the bottom of the upper block 16 and fastened thereto, there are a pair of smooth guides 15, 15. A lower plate 14 is provided with a pair of holes 8, 8, through which the guides 15, 15 pass so that the lower plate 14 may slide on the guides 15, 15, yet remain coaxial with the channel. The bottom portion of the adjustment screw 13 is threaded, and is in engagement with a threaded hole 7 in the lower plate 14. The lower plate 14 is dimensioned to pass under the way 18 (see FIGURE 3), so that when the screw 13 is adjusted, the way 18 is gripped or seized between the upper block 16 and the lower plate 14. It is to be noted that the lower plate 14 is positioned at three points by the guides 15, 15 and the adjustment screw 13 so that the gripping surfaces defined by the transverse channel 10 and the lower plate 14 are generally coaxial with respect to the way 18. This permits the mounting to yield or slide with respect to the advancing movement of the carriage exerted on a stop (infra), yet firmly hold the dial indicator 12 in a fixed position. The base 16 and the plate 14 define a pair of mounting members for the dial gauge.

The dial gauge 12 is provided wtih a probe 19. The inward intrusion of this probe 19 into the body of the dial gauge 12 when the probe 19 encounters the carriage 20 of a lathe, is reflected by the indicator on the face of the dial gauge 12. The base 16 of the mounting 11 has a threaded passage therethrough in which there is carried an adjustable stop 21. Nuts 22, 22 adjust the position of the stop so that it will encounter the carriage 20 before the maximum degree of retraction of the probe 19 into the body of the dial gauge 12 is accomplished by the advancing carriage 20. In order for the base 16 and the plate 14, which define the mounting members, to yield to the carriage, it has been found essential to insure that the plate 14 lies normal to the bottom of the way 18. This will usually mean that the plate 14 is perpendicular to the guides. In FIGURE 3, it will be seen that the plate 14 is perpendicular to the guides 15, and also flatly engages the bottom of the way 18. Strong pressure on the stop 21 will then not cause the plate 14 or the base 16 to bind on the way, because they are both maintained in flat or normal engagement therewith. The plate 14 and base 16 will slide. If the engagement was not normal, they would be canted at an acute angle and would tend to bind. A normalizing influence is obtained by the means for regulating the normal engagement of the plate 14 with the way 18: the pair of adjustment screws 23, 23 on the plate 14. They can be adjusted to bear on the base 16 (see FIG. 3) so that the plate 14 can be positioned normal to the way 18 and perpendicular to the guides 15. The base 16 is likewise held normally engaged with the way 18. When the stop 21 encounters the advancing carriage 20, the mounting 11 will yield to the advancing carriage 20 by sliding on the way 18, and in doing so, the carriage 20 cannot push the probe 19 destructively further into the body of the dial gauge 12 or rip the gauge 12 from its mounting 11. The mounting 11 slides on the way 18, and in this way, the dial gauge 12 is protected from damage by destructive pressure exerted upon the probe 19. Yet the mounting is sufficiently firmly attached to the way 18 that the mere encounter of the carriage 20 with the probe 19 wil not shift the gauge 12 position.

The base 16, by means of the transverse channel 10 and the lower plate 14, provide a firm mounting for the dial gauge 12 normally not yieldable to contact of the probe with the carriage. The dial gauge, once having been positioned with the probe in contact with the carriage 20, accurately measures the changes of distance through which the carriage moves. If the probe is initially positioned with respect to the position of the workpiece, the movement of the carriage accurately reflects whatever work is performed upon the workpiece. The common use of dial gauges for this purpose becomes increasingly convenient and safe by the use of this protective mount.

The foregoing description is merely intended to illustrate an embodiment of the invention. The component parts have been shown and described. They each may have substitutes which may perform a substantially similar function; such substitutes may be known as proper substitutes for the said components and may have actually been known or invented before the present invention; these substitutes are contemplates as being within the scope of the appended claims, although they are not specifically catalogued herein.

What is claimed:

1. A protective mounting for a dial indicator comprising:
   (a) a pair of mounting members,
   (b) means to adjust the distance between the pair of mounting members whereby they seize between them the way of the lathe,
   (c) a dial indicator attached to one of the mounting members,
   (d) a probe on the dial indicator extending generally toward a carriage of the lathe,
   (e) a stop rigidly attached to one of the mounting members,
   (f) the stop extending from the mounting member sufficiently to engage the carriage before the probe is completely pushed into the gauge,
   (g) means to maintain the mounting members normal to the way of the lathe.

2. A protective mounting for a dial indicator comprising:
   (a) the device according to claim 1, in which one of the mounting members is a base having a channel.

3. A protective mounting for a dial indicator comprising:
   (a) the device according to claim 1, in which one of the mounting members is a base having a channel with a generally truncated conical cross-sectional configuration.

4. A protective mounting for a dial indicator comprising:
   (a) the device according to claim 1, in which one of the mounting members is a plate.

5. A protective mounting for a dial indicator comprising:
   (a) the device according to claim 1, in which one of the mounting members is a base having a channel with a generally truncated conical cross-sectional configuration and the other of the mounting members is a plate cooperative with the first mounting member.

6. A protective mounting for a dial indicator comprising:
   (a) the device according to claim 1,
   (b) a pair of guides for one mounting member extending from the other mounting member which is slidably mounted on the pair of guides, and
   (c) the means to adjust the distance between the pair of mounting members is a screw passing through the one mounting member and in threaded engagement with the other mounting member.

7. A protective mounting for a dial indicator comprising:
   (a) the device according to claim 1, in which the means to maintain the mounting members normal to the way of the lathe is a pair of adjustment screws mounted on one of the mounting members and engageable with the other mounting member.

8. A protective mounting for a dial indicator comprising:
   (a) the device according to claim 5, and
   (b) a pair of adjustment screws on the plate engageable with the base whereby the base and the plate may be adjustably positioned with respect to each other and in normal engagement with the way of the lathe.

References Cited

UNITED STATES PATENTS

| | | | |
|---|---|---|---|
| 2,406,793 | 9/1946 | Benkoe | 33—125 |
| 2,458,344 | 1/1949 | Carroll. | |
| 2,811,779 | 11/1957 | Chase | 33—125 |

LEONIDAS VLACHOS, *Primary Examiner.*

U.S. Cl. X.R.

33—125; 77—34.5